(12) United States Patent
Mikoshiba

(10) Patent No.: US 12,398,514 B2
(45) Date of Patent: Aug. 26, 2025

(54) CONTROL METHOD FOR SHEET MANUFACTURING APPARATUS

(71) Applicant: SEIKO EPSON CORPORATION, Tokyo (JP)

(72) Inventor: Takao Mikoshiba, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 382 days.

(21) Appl. No.: 17/972,636

(22) Filed: Oct. 25, 2022

(65) Prior Publication Data

US 2023/0129241 A1 Apr. 27, 2023

(30) Foreign Application Priority Data

Oct. 27, 2021 (JP) .................................. 2021-175295

(51) Int. Cl.
*D21F 7/00* (2006.01)
*D21F 5/18* (2006.01)
*D21F 5/20* (2006.01)

(52) U.S. Cl.
CPC ................ *D21F 7/003* (2013.01); *D21F 5/18* (2013.01); *D21F 5/20* (2013.01)

(58) Field of Classification Search
CPC ... D21F 7/003; D21F 5/18; D21F 5/20; D21F 11/00; D21F 9/00; Y02W 30/64
See application file for complete search history.

(56) References Cited

U.S. PATENT DOCUMENTS

| 10,146,217 | B2 * | 12/2018 | Pauly ................. G05B 19/4186 |
| 11,005,133 | B2 * | 5/2021 | Oguchi .................... B32B 27/36 |
| 11,008,707 | B2 * | 5/2021 | Yoda ....................... D21H 21/06 |
| 11,028,536 | B2 * | 6/2021 | Miyasaka ............. D01G 25/00 |
| 11,060,242 | B2 * | 7/2021 | Abe ........................... D21B 1/10 |
| 11,193,238 | B2 * | 12/2021 | Oguchi ...................... D21F 9/00 |
| 11,313,078 | B2 * | 4/2022 | Oguchi ................... D21H 17/33 |
| 11,384,482 | B2 * | 7/2022 | Inaba ...................... D21F 7/008 |
| 11,566,373 | B2 * | 1/2023 | Mikoshiba ............. D21B 1/061 |
| 2019/0270220 | A1 * | 9/2019 | Oguchi .................. D21G 9/0036 |
| 2021/0277602 | A1 * | 9/2021 | Oguchi ................... D04H 1/732 |
| 2021/0292970 | A1 * | 9/2021 | Oguchi ................... D21H 17/33 |
| 2021/0292971 | A1 * | 9/2021 | Gomi ........................ D21F 9/00 |
| 2023/0129241 | A1 * | 4/2023 | Mikoshiba ................ D21F 5/18 162/198 |
| 2023/0313460 | A1 * | 10/2023 | Mikoshiba ............. D21H 11/14 |
| 2023/0313461 | A1 * | 10/2023 | Mikoshiba ........... D21G 9/0018 |
| 2024/0175203 | A1 * | 5/2024 | Ota .......................... D21B 1/32 |
| 2025/0055911 | A1 * | 2/2025 | Binder .................... H04L 67/12 |

FOREIGN PATENT DOCUMENTS

| JP | 6252232 B2 | * | 12/2017 | .............. B27N 3/04 |
| JP | 2020-143398 A | | 9/2020 | |
| JP | 2023064869 A | * | 5/2023 | .............. D21F 5/18 |

* cited by examiner

*Primary Examiner* — Jose A Fortuna
(74) *Attorney, Agent, or Firm* — Global IP Counselors, LLP

(57) ABSTRACT

A control method for a sheet manufacturing apparatus includes a stop signal input step of inputting, to the sheet manufacturing apparatus manufacturing a sheet, a stop signal stopping manufacturing of the sheet and a drying step of drying a predetermined area of the sheet manufacturing apparatus by controlling a blower of the sheet manufacturing apparatus after the stop signal input step.

8 Claims, 10 Drawing Sheets

CONTROL METHOD FOR SHEET MANUFACTURING APPARATUS

The present application is based on, and claims priority from JP Application Serial Number 2021-175295, filed Oct. 27, 2021, the disclosure of which is hereby incorporated by reference herein in its entirety.

BACKGROUND

1. Technical Field

The present disclosure relates to a control method for a sheet manufacturing apparatus and a sheet manufacturing apparatus.

2. Related Art

A sheet manufacturing apparatus for manufacturing sheets is known. For example, JP-A-2020-143398 describes a paper processing apparatus that cleans devices by using water.

However, in the paper processing apparatus using water as described above, rust may form or various biological contaminants may proliferate due to humidity in the apparatus after the manufacturing of sheets is stopped.

SUMMARY

A control method for a sheet manufacturing apparatus according to an aspect of the present disclosure includes: a stop signal input step of inputting, to the sheet manufacturing apparatus manufacturing a sheet, a stop signal stopping manufacturing of the sheet; and a drying step of drying a predetermined area of the sheet manufacturing apparatus by controlling a blower of the sheet manufacturing apparatus after the stop signal input step.

A sheet manufacturing apparatus according to an aspect of the present disclosure includes: a manufacturing section manufacturing a sheet; and a control section controlling the manufacturing section, in which the control section dries the predetermined area of the manufacturing section by controlling the blower of the manufacturing section when receiving a stop signal stopping operation of the manufacturing section.

DESCRIPTION OF EXEMPLARY EMBODIMENTS

Preferred embodiments of the present disclosure will be described in detail below with reference to the drawings. It should be noted that the embodiments described below do not unreasonably limit the content of the present disclosure described in the claims. In addition, not all of the components described below are essential structural requirements for the present disclosure.

Figure 1:
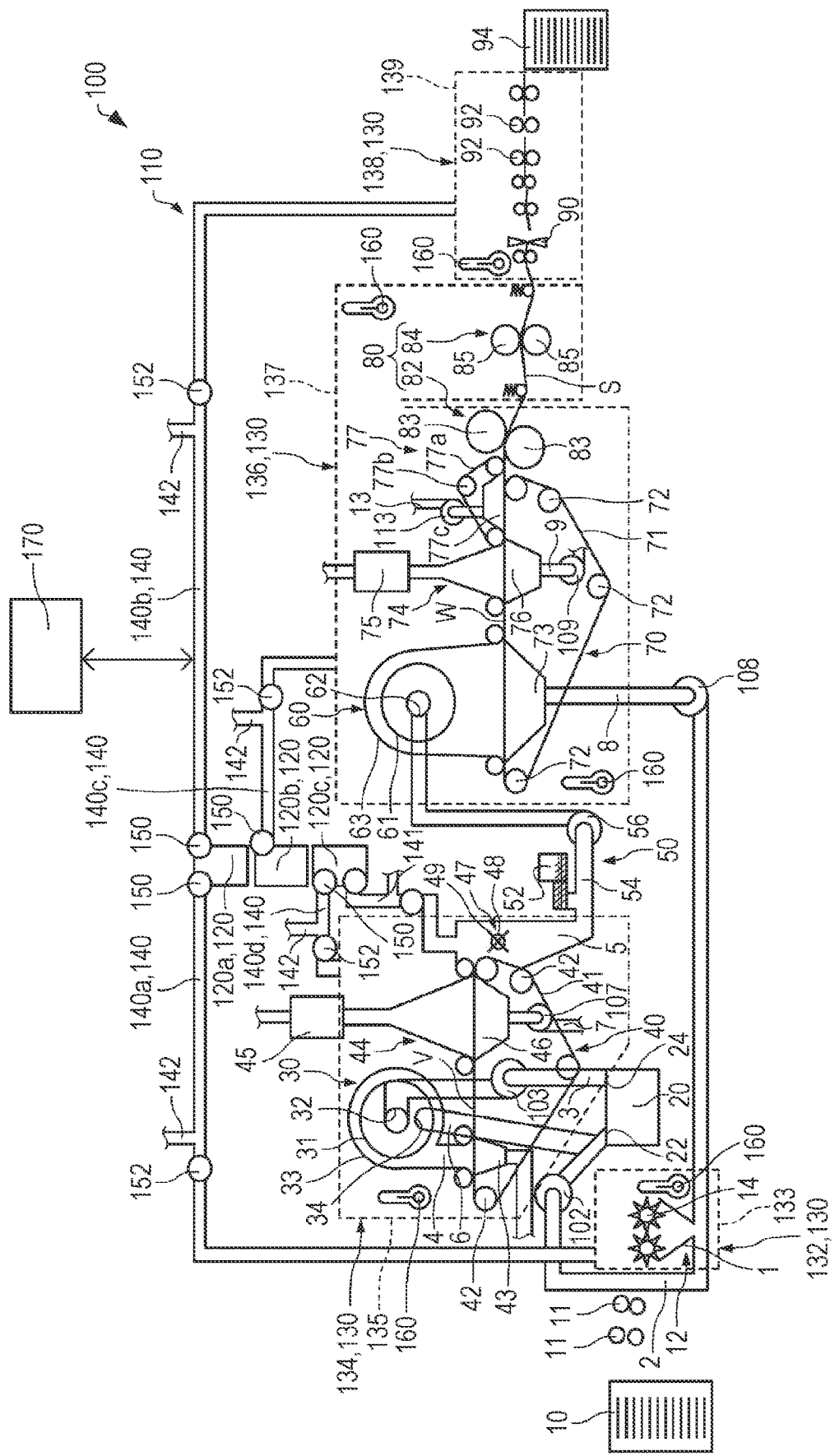
FIG. 1 is a diagram schematically illustrating a sheet manufacturing apparatus according to a first embodiment.

1. First Embodiment 1.1 Sheet Manufacturing Apparatus 1.1.1 Overall Structure First, a sheet manufacturing apparatus according to a first embodiment will be described with reference to the drawings. FIG. 1 is a diagram schematically illustrating the sheet manufacturing apparatus 100 according to the first embodiment.

As illustrated in FIG. 1, the sheet manufacturing apparatus 100 includes a manufacturing section 110 and a control section 170. The manufacturing section 110 manufactures a sheet S. The manufacturing section 110 includes, for example, a supply section 10, a coarse crushing section 12, a defibering section 20, a sorting section 30, a first web forming section 40, a first moisture adding section 44, a rotating body 47, a mixing section 50, an accumulation section 60, a second web forming section 70, a second moisture adding section 74, a transport mechanism 77, a sheet forming section 80, a cutting section 90, an ejection reception section 94, and a humidifier 120.

The supply section 10 supplies a raw material to the coarse crushing section 12. The supply section 10 is, for example, an automatic feeding section for continuously feeding the raw material to the coarse crushing section 12. The raw material supplied by the supply section 10 includes, for example, fibers such as used paper and pulp sheets. In the illustrated example, the raw material is transported to the coarse crushing section 12 via a transport roller 11.

The coarse crushing section 12 cuts the raw material supplied by the supply section 10 into strips in a gas such as air. The strips are, for example, several centimeters long. In the illustrated example, the coarse crushing section 12 has a coarse crushing blade 14 and cuts the fed raw material with the coarse crushing blade 14. The coarse crushing section 12 is, for example, a shredder. The raw material cut by the coarse crushing section 12 is received by a hopper 1 and then transported to the defibering section 20 through a pipe 2. The pipe 2 is provided with a blower 102. The blower 102 generates an air flow that transports the cut raw material to the defibering section 20.

The defibering section 20 defibers the raw material cut by the coarse crushing section 12. Here, "defibering" denotes unraveling of the raw material including a plurality of bound fibers into individual fibers. The defibering section 20 further has a function of separating, from fibers, substances such as resin particles, ink, toner, and bleed inhibitors which have adhered to the raw material.

Substances having passed through the defibering section 20 are called defibered substances. Defibered substances may include resin particles, coloring agents such as ink and toner, which have separated from fibers when the fibers are unraveled, and additives such as bleed inhibitors and paper strength enhancers, in addition to unraveled defibered substance fibers. The unraveled defibered substance is shaped like a string. The unraveled defibered substance may be present in an independent state in which it is not entangled with other unraveled fibers or may be present in a cluster state in which it is entangled with other unraveled defibered substances to form a cluster.

The defibering section 20 performs dry-type defibering. Here, "dry type" denotes processing such as defibering or accumulation performed in a gas such as air, rather than in a liquid. For example, an impeller mill is used as the defibering section 20. The defibering section 20 has a function of generating an air flow that sucks the raw material and discharges the defibered substance. This enables the defibering section 20 to suck the raw material through the inlet 22 together with an air flow generated by the defibering section 20, defiber the raw material, and transport the defibered substance to the outlet 24. The defibered substance having passed through the defibering section 20 is transported to the sorting section 30 through a pipe 3.

It should be noted that the air flow for transporting the defibered substance from the defibering section 20 to the sorting section 30 may be the air flow generated by the defibering section 20 or the air flow generated by a blower 103 to be provided in the pipe 3.

The sorting section 30 introduces, through an inlet 32, the defibered substance defibered by the defibering section 20 and sorts the defibered substance according to the fiber length. The sorting section 30 has, for example, a drum section 31 and a housing section 33 that accommodates the drum section 31. For example, a sieve is used as the drum section 31. The drum section 31 has a mesh. The drum section 31 can separate the introduced defibered substance into a first sorted substance that passes through the mesh and a second sorted substance that does not pass through the mesh. The first sorted substance is a fiber or particle that is smaller than the size of the openings of the mesh. The second selection is a fiber, an undefibered piece, or a cluster that is larger than the size of the openings of the mesh. The first sorted substance is transferred to the accumulation section 60 through a pipe 4 and a pipe 5. The second sorted substance is returned to the defibering section 20 from an outlet 34 through a pipe 6. Specifically, the drum section 31 is a cylindrical sieve that is rotationally driven by a motor. For example, a wire mesh, an expanded metal mesh obtained by stretching a metal plate having openings, or a punching metal mesh having holes in the metal plate formed by a press machine or the like is used as the mesh of the drum section 31.

The first web forming section 40 transports the first sorted substance having passed through the sorting section 30 to the pipe 5. The first web forming section 40 includes, for example, a mesh belt 41, a stretching roller 42, and a suction mechanism 43.

The first sorted substance having passed through the openings of the sorting section 30 is accumulated on the mesh belt 41. The mesh belt 41 is stretched by the stretching roller 42 and has a structure that does not easily pass the passed-through substance but easily passes air. The mesh belt 41 moves when the stretching roller 42 rotates. The first sorted substance having passed through the sorting section 30 continuously accumulates on the mesh belt 41 while the mesh belt 41 continuously moves, thereby forming a web V on the mesh belt 41.

The suction mechanism 43 is provided below the mesh belt 41. The suction mechanism 43 generates a downward air flow. The first sorted substance dispersed in air by the sorting section 30 can be sucked onto the mesh belt 41 by the suction mechanism 43. This can increase the speed of discharge from the sorting section 30. Furthermore, the suction mechanism 43 can form a downflow in the drop path of the first sorted substance and prevent the defibered substances from being entangled with each other during the drop.

As described above, passing through the sorting section 30 and the first web forming section 40 causes the web V to contain a large amount of air and become soft and swollen.

The first moisture adding section 44 adds moisture to the web V on the mesh belt 41. The first moisture adding section 44 includes, for example, a mist humidifier 45 and a suction mechanism 46. The mist humidifier 45 forms a mist from water and adds moisture to the web V on the mesh belt 41. The mist humidifier 45 is, for example, an ultrasonic humidifier. The suction mechanism 46 is provided below the mesh belt 41. The suction mechanism 46 generates a downward air flow. The suction mechanism 46 can efficiently add the moisture from the mist humidifier 45 to the web V. The moisture having passed through the web V is discharged to the outside through a pipe 7. The pipe 7 is provided with a blower 107. The blower 107 generates an air flow for discharging the moisture to the outside. The web V to which the moisture has been added is fed to the pipe 5 and transported to the accumulation section 60.

The rotating body 47 is provided in the pipe 5. The rotating body 47 cuts the web V. In the illustrated example, the rotating body 47 has a base portion 48 and projection portions 49 projecting from the base portion 48. The protrusion 49 has, for example, a plate-like shape. In the illustrated example, four protrusions 49 are provided at equal intervals. As the base portion 48 rotates, the projection portions 49 rotate about the base portion 48. By cutting the web V via the rotating body 47, for example, fluctuations in the amount of the defibered substance per unit time supplied to the accumulation section 60 can be reduced.

The rotating body 47 is provided at a position at which the projection portions 49 can make contact with the web V but do not make contact with the mesh belt 41 on which the web V is accumulated. This can prevent the mesh belt 41 from being worn by the projection portions 49. The shortest distance between the projection portions 49 and the mesh belt 41 is, for example, not less than 0.05 mm and not more than 0.5 mm.

The mixing section 50 mixes the first sorted substance having passed through the sorting section 30 with an additive. The mixing section 50 includes, for example, an additive supply section 52 that supplies the additive, a pipe 54 through which the first sorted substance and the additive are transported, and a blower 56. The pipe 54 communicates with the pipe 5.

In the mixing section 50, an air flow is generated by the blower 56, and the first sorted substance and the additive are transported while being mixed with each other in the pipe 54. It should be noted that the mechanism for mixing the first sorted substance with the additive is not particularly limited and may be a device for performing agitation by using blades rotating at high speed or a device in which a container is rotated, as in a V-type mixer.

A screw feeder as illustrated in FIG. 1 or a disc feeder, which is not illustrated, is used as the additive supply section 52. The additive supplied from the additive supply section 52 contains a resin for binding a plurality of fibers to each other. At the time the resin is supplied, the plurality of fibers are not bound to each other. The resin melts when passing through the sheet forming section 80 and binds the plurality of fibers to each other.

The resin supplied from the additive supply section 52 is a thermoplastic resin or a thermosetting resin, such as AS (acrylonitrile styrene) resin, ABS (acrylonitrile butadiene styrene) resin, polypropylene, polyethylene, polyvinyl chloride, polystyrene, acrylate resin, polyester, polyethylene terephthalate, polyphenylene ether, polybutylene terephthalate, nylon, polyamide, polycarbonate, polyacetal, polyphenylene sulfide, polyether ether ketone, or the like. These resins may be used alone or in mixture as appropriate. The additive supplied from the additive supply section 52 may be in the form of fibers or powder.

It should be noted that the additive supplied from the additive supply section 52 may include colorants for coloring fibers, aggregation inhibitors for suppressing the aggregation of fibers and the aggregation of resin, and flame retardants to suppress the fibers and the like from burning according to the sheet S to be manufactured, in addition to resins for binding fibers to each other. The mixture having passed through the mixing section 50 is transported to the accumulation section 60 through the pipe 54.

The accumulation section 60 introduces the mixture having passed through the mixing section 50 through the inlet 62, unravels the entangled defibered substance, and drops the unraveled defibered substance while dispersing the defibered substance in air. The accumulation section 60 accumulates the defibered substance in a dry manner to form a web W. Furthermore, when the resin of the additive supplied from the additive supply section 52 is fibrous, the accumulation section 60 unravels the entangled resin. Accordingly, the accumulation section 60 can uniformly accumulate the mixture of the defibered substance and the additive on the second web forming section 70.

The accumulation section 60 includes, for example, a drum section 61 and a housing section 63 that accommodates the drum section 61. A rotating cylindrical sieve is used as the drum section 61. The drum section 61 has a mesh through which the fibers or particles that are included in the mixture having passed through the mixing section 50 and that are smaller than the size of the openings of the mesh are dropped. The structure of the drum section 61 is the same as, for example, the structure of the drum section 31.

It should be noted that the sieve of the drum section 61 does not need to have a function of sorting a specific object. That is, the sieve used as the drum section 61 is a component with a mesh, and the drum section 61 may drop the entire mixture introduced to the drum section 61.

The passed-through substance having passed through the accumulation section 60 is accumulated on the second web forming section 70 to form the web W. The second web forming section 70 includes, for example, a mesh belt 71, a stretching roller 72, and a suction mechanism 73.

The passed-through substance having passed through the opening of the accumulation section 60 is accumulated on the mesh belt 71. The mesh belt 71 is stretched by the stretching roller 72 and has a structure that does not easily pass the passed-through substance but easily passes air. The mesh belt 71 moves when the stretching roller 72 rotates. The passed-through substance having passed through the accumulation section 60 continuously accumulates on the mesh belt 71 while the mesh belt 71 continuously moves, thereby forming the web W on the mesh belt 71.

The suction mechanism 73 is provided below the mesh belt 71. The suction mechanism 73 generates a downward air flow. The mixture dispersed in air by the accumulation section 60 can be sucked onto the mesh belt 71 by the suction mechanism 73. This can increase the speed of discharge from the accumulation section 60. Furthermore, the suction mechanism 73 can form a downflow in the drop path of the mixture and prevent the defibered substance and the additive from being entangled with each other during the drop.

As described above, passing through the accumulation section 60 and the second web forming section 70 causes the web W to contain a large amount of air and become soft and swollen.

It should be noted that the passed-through substance having passed through the opening of the accumulation section 60 and then passed through the openings of the mesh belt 71 is returned to the pipe 2 through a pipe 8. The pipe 8 is provided with a blower 108. The blower 108 generates an air flow for returning the passed-through substance to the pipe 2.

The second moisture adding section 74 adds moisture to the web W on the mesh belt 71. The second moisture adding section 74 includes, for example, a mist humidifier 75 and a suction mechanism 76. The mist humidifier 75 forms a mist from water and adds moisture to the web W on the mesh belt 71. The mist humidifier 75 is, for example, an ultrasonic humidifier. The suction mechanism 76 is provided below the mesh belt 71. The suction mechanism 76 generates a downward air flow. The suction mechanism 76 can efficiently add the moisture from the mist humidifier 75 to the web W. The moisture having passed through the web W is discharged to the outside through a pipe 9. The pipe 9 is provided with a blower 109. The blower 109 generates an air flow for discharging the moisture to the outside.

The transport mechanism 77 transports the web W to which moisture has been added from the second web forming section 70 to the sheet forming section 80. The transport mechanism 77 includes, for example, a mesh belt 77a, a stretching roller 77b, and a suction mechanism 77c.

The mesh belt 77a makes contact with the upper surface of the web W. The mesh belt 77a is stretched by the stretching roller 77b. The mesh belt 77a moves when the stretching roller 77b rotates.

The suction mechanism 77c is provided above the mesh belt 77a. The suction mechanism 77c generates an upward air flow. The suction mechanism 77c causes the web W to be separated from the mesh belt 71, make contact with the mesh belt 77a, and be transported to the sheet forming section 80 by the mesh belt 77a. A pipe 13 is coupled to the suction mechanism 77c. The pipe 13 is provided with a blower 113 that generates an upward air flow.

The sheet forming section 80 forms the sheet S by pressurizing and heating the web W accumulated on the mesh belt 71. The sheet forming section 80 can bind a plurality of fibers in the mixture to each other via the additive by heating the mixture mixed in the web W.

The sheet forming section 80 includes, for example, a pressurizing section 82 that pressurizes the web W and a heating section 84 that heats the web W pressurized by the pressurizing section 82.

The pressurizing section 82 has a pair of calender rollers 83. The pair of calender rollers 83 applies pressure to the web W. The pressure causes the web W to be reduced in thickness and increased in bulk density.

The heating section 84 has a pair of heating rollers 85. The pair of heating rollers 85 heats the web W. The sheet S can be formed while the web W is continuously transported when the heating section 84 is configured as the heating rollers 85, compared with the case in which the heating section 84 is configured as a plate-like press device. The calender rollers 83 and the heating rollers 85 are disposed such that the rotary axes thereof are parallel to each other. The calender roller 83 can apply, to the web W, a pressure higher than the pressure applied to the web W by the heating roller 85. It should be noted that the number of calender rollers 83 and the number of heating rollers 85 are not particularly limited.

The cutting section 90 cuts the sheet S formed by the sheet forming section 80. In the illustrated example, the cutting section 90 cuts the sheet S in a direction intersecting the transport direction of the sheet S. The cutting section 90 forms a single sheet S with a predetermined size. The single sheet S is ejected to the ejection reception section 94 via the plurality of transport rollers 92. It should be noted that the number of transport rollers 92 is not particularly limited.

1.1.2 Humidifier and the Like

The manufacturing section 110 of the sheet manufacturing apparatus 100 includes, for example, the humidifier 120. Furthermore, the manufacturing section 110 of the sheet manufacturing apparatus 100 includes, for example, first connection pipes 140, branch pipes 142, first blowers 150, second blowers 152, and humidity sensors 160.

The humidifier 120 is, for example, an evaporative humidifier that causes moisture vaporization. The humidifier 120 humidifies a predetermined area 130 of the sheet manufacturing apparatus 100. For example, a plurality of humidifiers 120 may be provided. In the illustrated example, three humidifiers 120a, 120b, and 120c are provided as the humidifiers 120. The humidifiers 120a, 120b, and 120c are arranged, for example, in a predetermined direction.

The predetermined area 130 humidified by the humidifiers 120 is, for example, a coarse crushing area 132 in which a raw material is coarsely crushed, a sorting area 134 in which the defibered substance having been coarsely crushed and defibered is sorted, a sheet forming area 136 in which the sheet S is formed by accumulating the defibered substance having been sorted, or a cutting area 138 in which the formed sheet S is cut.

The coarse crushing area 132 includes the coarse crushing section 12 and a housing 133. The housing 133 houses the coarse crushing section 12. The sorting area 134 includes the sorting section 30, the first web forming section 40, and a housing 135. The housing 135 houses the sorting section 30 and the first web forming section 40. The sheet forming area 136 has the accumulation section 60, the second web forming section 70, the sheet forming section 80, and a housing 137. The housing 137 houses the accumulation section 60, the second web forming section 70, and the sheet forming section 80. The cutting area 138 includes the cutting section 90 and a housing 139. The housing 139 houses the cutting section 90.

The first connection pipes 140 couple the humidifiers 120 and the predetermined area 130 to each other. A plurality of first connection pipes 140 are provided. In the illustrated example, four first connection pipes 140 are provided as first connection pipes 140a, 140b, 140c, and 140d.

The first connection pipe 140a couples the humidifier 120a and the coarse crushing area 132 to each other. The first connection pipe 140b couples the humidifier 120a and the cutting area 138 to each other. The first connection pipe 140c couples the humidifier 120b and the sheet forming area 136 to each other. The first connection pipe 140d couples the humidifier 120c and the sorting area 134 to each other. Furthermore, the humidifier 120c is coupled to the pipe 5 by a connecting pipe 141.

The branch pipes 142 are branched from portions of the first connection pipes 140 between the first blowers 150 and the second blowers 152. In other words, the branch pipes 142 are branched from portions of the first connection pipes 140 between the first blowers 150 and the second blowers 152. The sheet manufacturing apparatus 100 can suck outside air through the branch pipes 142.

The first blowers 150 and the second blowers 152 are provided in the first connection pipes 140. The first blowers 150 are located closer to the humidifier 120 than the second blowers 152 in the path of the first connection pipes 140. In the illustrated example, the first blowers 150 are provided in the connection portions between the first connection pipes 140 and the humidifier 120. The second blowers 152 are located closer to the predetermined area 130 than the first blowers 150 in the paths of the first connection pipes 140. The humidifier 120 can humidify the predetermined area 130 by feeding moisture to the predetermined area 130 with the first blowers 150 and the second blowers 152 driven.

The humidity sensors 160 are provided in the predetermined areas 130. In the illustrated example, one humidity sensor 160 is provided in each of the housings 133, 135, and 139, and two humidity sensors 160 are provided in the housing 137. One of the two humidity sensors 160 provided in the housing 137 is provided in a portion close to the accumulation section 60, and the other is provided in a portion close to the heating section 84. The humidity sensor 160 detects the humidity of the predetermined area 130. The humidity sensor 160 may further detect the temperature of the predetermined area 130. It should be noted that the sheet forming area 136 may be divided into an area including the accumulation section 60 and the pressurizing section 82 and an area including the heating section 84.

1.1.3 Control Section

The sheet manufacturing apparatus 100 includes the control section 170. The control section 170 includes a computer having, for example, a processor, a main storage device, and an input/output interface for inputting and outputting signals to and from the outside. The control section 170 performs various functions by, for example, causing the processor to execute a program read into the main storage device. Specifically, the control section 170 controls the manufacturing section 110 of the sheet manufacturing apparatus 100. It should be noted that the control section 170 may include a combination of a plurality of circuits instead of the computer.

1.2 Control Method for Sheet Manufacturing Apparatus

Figure 2:
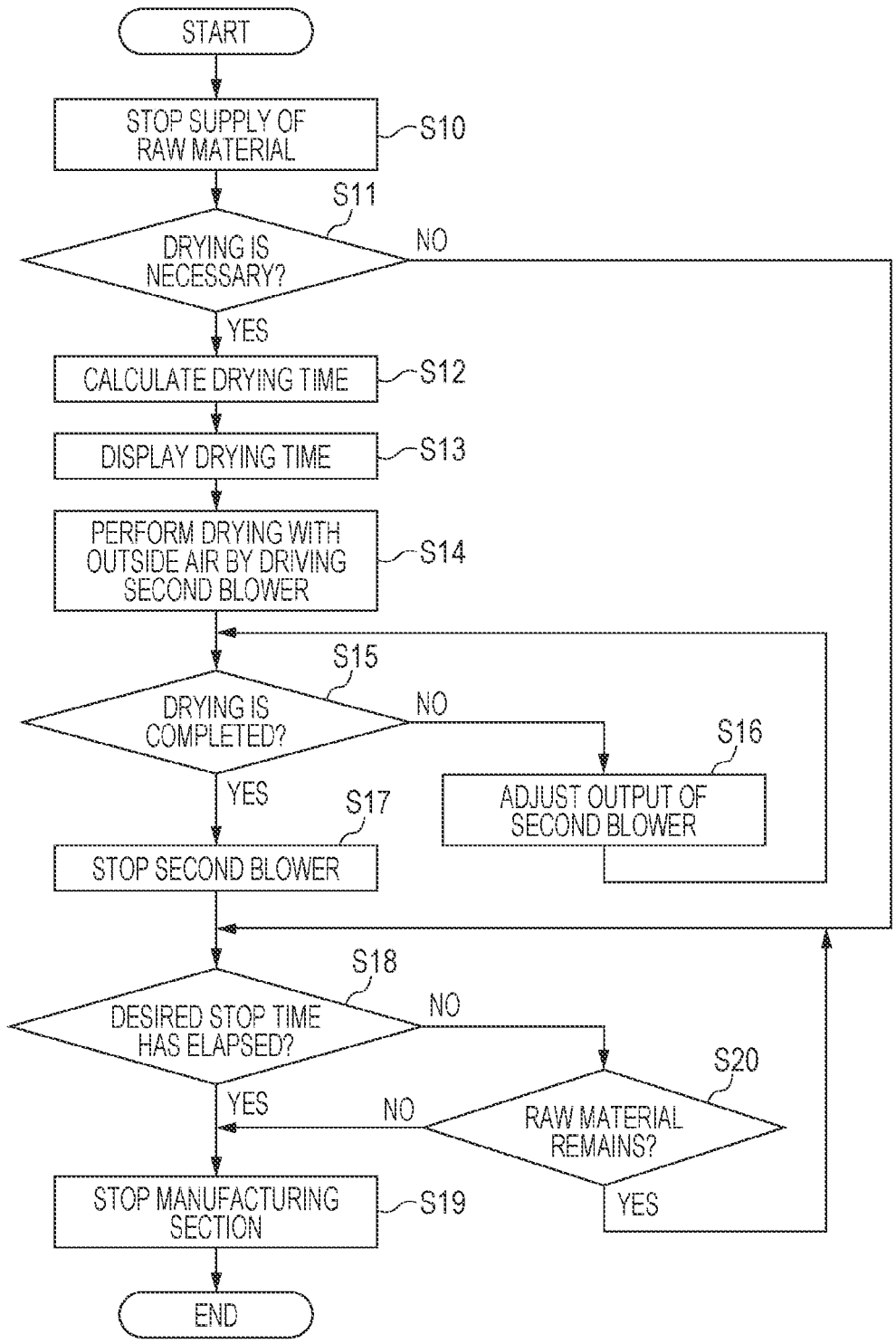
FIG. 2 is a flowchart for describing a control method for the sheet manufacturing apparatus according to the first embodiment.

Next, a control method for the sheet manufacturing apparatus 100 according to the first embodiment will be described with reference to the drawings. FIG. 2 is a flowchart for describing the control method for the sheet manufacturing apparatus 100 according to the first embodiment.

The user inputs a stop signal for stopping the manufacturing of the sheet S to the sheet manufacturing apparatus 100 that manufactures the sheet S. Specifically, the user inputs the stop signal for stopping the operation of the manufacturing section 110 to the control section 170 by operating an operation section, which is not illustrated. The stop signal includes, for example, the data of a desired stop time. The desired stop time is the time desired by the user from when the stop signal is input to the control section 170 until the operation of the manufacturing section 110 is stopped. The operation section includes, for example, a mouse, a keyboard, a touch panel, and the like. The control section 170 starts the processing when receiving the stop signal.

First, in step S10, the control section 170 causes the supply section 10 to stop the supply of a raw material, as illustrated in FIG. 2.

Next, in step S11, in accordance with the detection values of the humidity sensors 160 provided in the predetermined areas 130, the control section 170 determines whether the predetermined areas 130 need to be dried.

Specifically, the control section 170 acquires the detection value of each of the humidity sensors 160 and determines that the predetermined area 130 does not need to be dried when the detection value acquired from the humidity sensor 160 is smaller than or equal to a predetermined value or determines that the predetermined area 130 needs to be dried when the detection value acquired from the humidity sensor 160 is larger than the predetermined value. When there are a plurality of predetermined areas 130, the control section 170 determines whether each of the predetermined areas 130 needs to be dried.

In step S12, when determining that the predetermined area 130 needs to be dried, that is, the result in step S11 is YES, the control section 170 calculates the drying time required to dry the predetermined area 130 in accordance with the detection value of the humidity sensor 160.

Specifically, a storage section, which is not illustrated, stores a table illustrating the relationship between the detection value of the humidity sensor 160 and the drying time of the predetermined area 130, and the control section 170 calculates the time required to dry the predetermined area 130 by verifying the acquired detection value of the humidity sensor 160 against this table.

Next, in step S13, the control section 170 displays the calculated time in a display section, which is not illustrated. The user is able to see the drying time by looking at the display section. The display section includes, for example, a liquid crystal display (LCD), an organic EL (electroluminescence) display, an EPD (electrophoretic display), a touch panel display, or the like.

Next, in step S14, the control section 170 dries the predetermined area 130 with the outside air by controlling the first blowers 150 and the second blowers 152.

Figure 3:
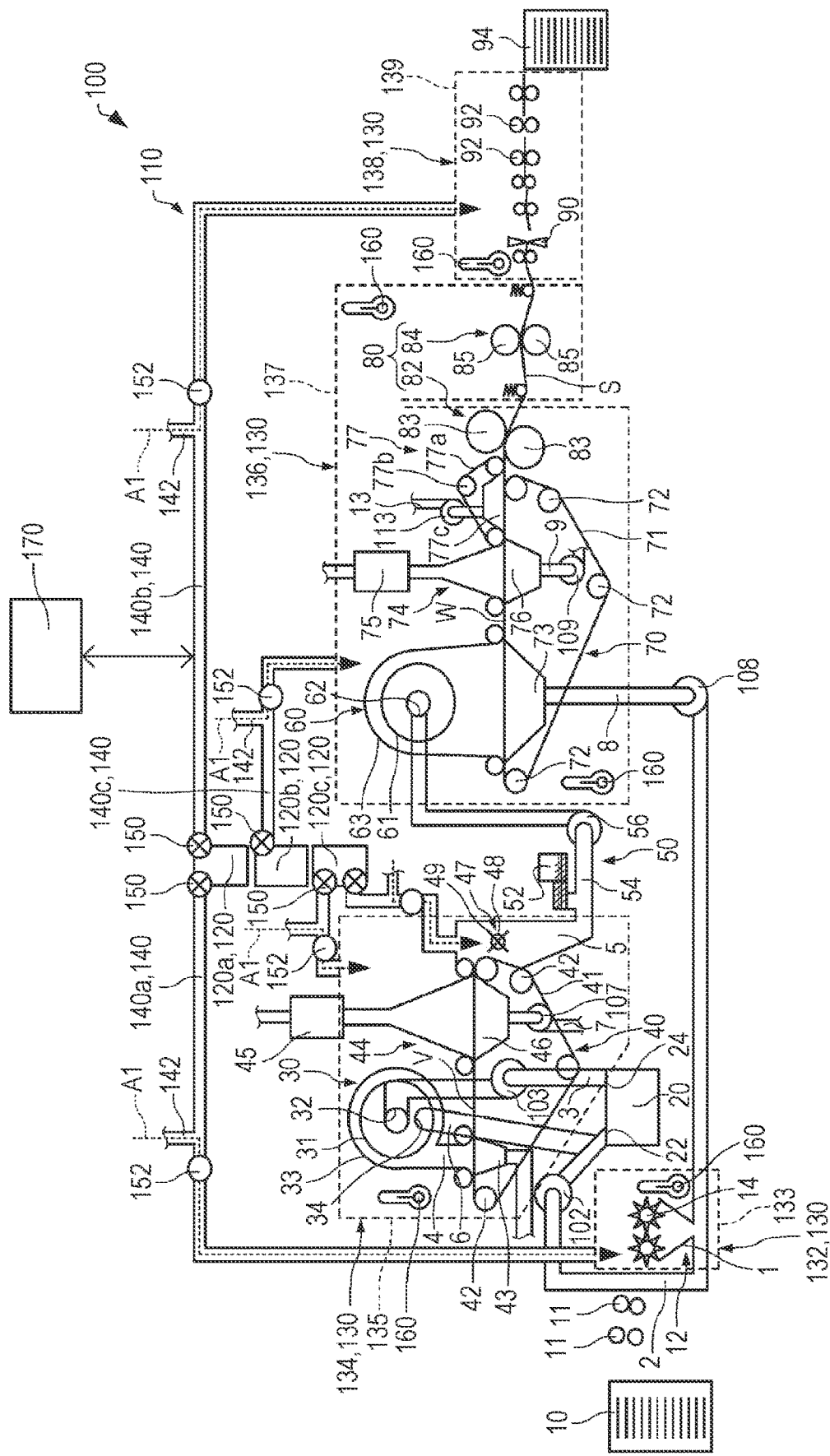
FIG. 3 is a diagram schematically illustrating the sheet manufacturing apparatus according to the first embodiment.

Specifically, the control section 170 blows the outside air supplied through the branch pipe 142 to the predetermined area 130 by driving the second blowers 152 with the driving of the first blowers 150 stopped as illustrated in FIG. 3. The predetermined area 130 is dried with the outside air. Before performing step S14, the first blowers 150 and the second blowers 152 may or may not be driven.

It should be noted that FIG. 3 is a sectional view schematically illustrating the sheet manufacturing apparatus 100 and describes the control method for the sheet manufacturing apparatus 100. In FIG. 3, the flows of the outside air supplied through the branch pipes 142 are indicated by arrows A1. In addition, in FIG. 3, the first blowers 150 that are not driven are indicated by circles with crosses.

Next, in step S15, the control section 170 determines whether the drying of the predetermined area 130 is completed.

Specifically, the control section 170 acquires the detection value of each of the humidity sensors 160 and determines that the drying of the predetermined area 130 is completed when the acquired detection value of the humidity sensor 160 is equal to or smaller than the predetermined value or determines that the drying of the predetermined area 130 is not completed when the acquired detection value of the humidity sensor 160 is larger than the predetermined value. The predetermined value in step S15 may be the humidity of the outside air.

In step S16, when determining that the drying of the predetermined area 130 is not completed, that is, the result in step S15 is NO, the control section 170 adjusts the output of the second blowers 152 in accordance with the detection value of the humidity sensor 160 acquired in step S15.

Specifically, the control section 170 determines whether the drying of the predetermined area 130 is completed within the time displayed in the display section in step S13 by verifying the acquired detection value of the humidity sensor 160 against the table stored in the storage section. When determining that the drying of the predetermined area 130 is not completed within the time displayed in the display section, the control section 170 increases the output of the second blowers 152. When determining that the drying of the predetermined area 130 is completed within the time displayed in the display section, the control section 170 maintains the output of the second blowers 152. The control section 170 repeats steps S15 and S16 until it is determined in step S15 that the drying of the predetermined area 130 is completed.

In step S17, when determining that the drying of the predetermined area 130 is completed, that is, the result in step S15 is YES, the control section 170 stops the driving of the second blowers 152. When there are a plurality of predetermined areas 130, if determining that the drying is completed in all of the predetermined areas 130, the control section 170 stops the driving of the second blowers 152.

Next, in step S18, the control section 170 determines whether the desired stop time has elapsed after the stop signal is input.

In step S19, when determining that the desired stop time has elapsed after the stop signal is entered, that is, the result in step S18 is YES, the control section 170 stops the operation of the manufacturing section 110. The control section 170 stops the operation of the manufacturing section 110 even when, for example, the raw material for manufacturing the sheet S remains in the manufacturing section 110. Then, the control section 170 ends the processing.

In step S20, when determining that the desired stop time has not elapsed after the stop signal is input, that is, the result in step S18 is NO, the control section 170 determines whether the raw material remains in the manufacturing section 110. For example, the manufacturing section 110 has a sensor, not illustrated, that detects the raw material, and the control section 170 determines whether the raw material remains in the manufacturing section 110 in accordance with the detection result of the sensor.

When determining that the raw material remains in the manufacturing section 110, that is, the result in step S20 is YES, the control section 170 returns the processing to step S18. The control section 170 repeats steps S18 and S20 until it is determined in step S18 that the desired stop time has been elapsed.

When determining that the raw material does not remain in the manufacturing section 110, that is, the result in step S20 is NO, the control section 170 proceeds to step S19. Then, the control section 170 ends the processing.

When determining that drying of the predetermined area 130 is not necessary, that is, the result in step S11 is NO, the control section 170 proceeds to step S18. Then, the control section 170 performs step S19 and ends the processing.

1.3 Operation and Effect

The control method for the sheet manufacturing apparatus 100 includes a stop signal input step of inputting, to the sheet manufacturing apparatus 100 manufacturing the sheet S, the stop signal stopping manufacturing of the sheet and a drying step of drying the predetermined area 130 of the sheet manufacturing apparatus 100 by controlling the blowers 150 and 152 of the sheet manufacturing apparatus 100 after the stop signal input step. Accordingly, in the control method for the sheet manufacturing apparatus 100, the humidity within the sheet manufacturing apparatus 100 can be reduced after the manufacturing of the sheet S is stopped. This can reduce the possibility that rust forms or biological contaminants proliferate due to moisture after the manufacturing of sheet S is stopped.

The control method for the sheet manufacturing apparatus 100 further includes a determination step of determining whether the predetermined area 130 needs to be dried in accordance with the detection value of the humidity sensor 160 provided in the predetermined area 130, in which the drying step is performed when it is determined in the determination step that the predetermined area 130 needs to be dried. Accordingly, since the drying process is performed only when the predetermined area 130 needs to be dried in the control method for the sheet manufacturing apparatus 100, power can be further saved compared with the case in which the drying step is always performed without the determination step. It should be noted that the control method may have a sequence such that the dry step is always performed when the stop signal is input without including the determination step of determining whether the predetermined area 130 needs to be dried.

The control method for the sheet manufacturing apparatus 100 includes the step of calculating the time required for the drying step in accordance with the detection value of the humidity sensor 160. Accordingly, in the control method for the sheet manufacturing apparatus 100, the user can be informed of the time required for the drying step.

In the control method for the sheet manufacturing apparatus 100, the sheet manufacturing apparatus 100 includes the humidifiers 120 that humidify the predetermined areas 130 and the first connection pipes 140 that couple the humidifiers 120 and the predetermined area 130 to each other. Furthermore, the sheet manufacturing apparatus 100 includes the first blowers 150 provided in the first connection pipes 140, the second blowers 152 provided in the first connection pipes 140 and located closer to the predetermined areas 130 than the first blowers 150 in the paths of the first connection pipes 140, and the branch pipes 142 branched from portions of the first connection pipes 140 between the first blowers 150 and the second blowers 152. Accordingly, in the control method for the sheet manufacturing apparatus 100, the predetermined areas 130 can be humidified by the humidifiers 120. This can prevent, for example, the fibers from adhering to the sheet manufacturing apparatus 100 due to static electricity.

In the control method for the sheet manufacturing apparatus 100, in the drying step, the outside air supplied through the branch pipe 142 is blown to the predetermined area 130 by the second blowers 152 being driven with the driving of the first blower 150 stopped. Accordingly, in the control method for the sheet manufacturing apparatus 100, the predetermined area 130 can be dried with the outside air.

In the control method for the sheet manufacturing apparatus 100, each of the predetermined areas 130 is the coarse crushing area 132 in which the raw material is coarsely crushed, the sorting area 134 in which the defibered substance having been coarsely crushed and defibered is sorted, the sheet forming area 136 in which the sheet S is formed by accumulating the defibered substance having been sorted, or the cutting area 138 in which the formed sheet S is cut. Accordingly, in the control method for the sheet manufacturing apparatus 100, at least one of the coarse crushing area 132, the sorting area 134, the sheet forming area 136, and the cutting area 138 can be dried.

2. Second Embodiment 2.1 Sheet Manufacturing Apparatus

Figure 4:
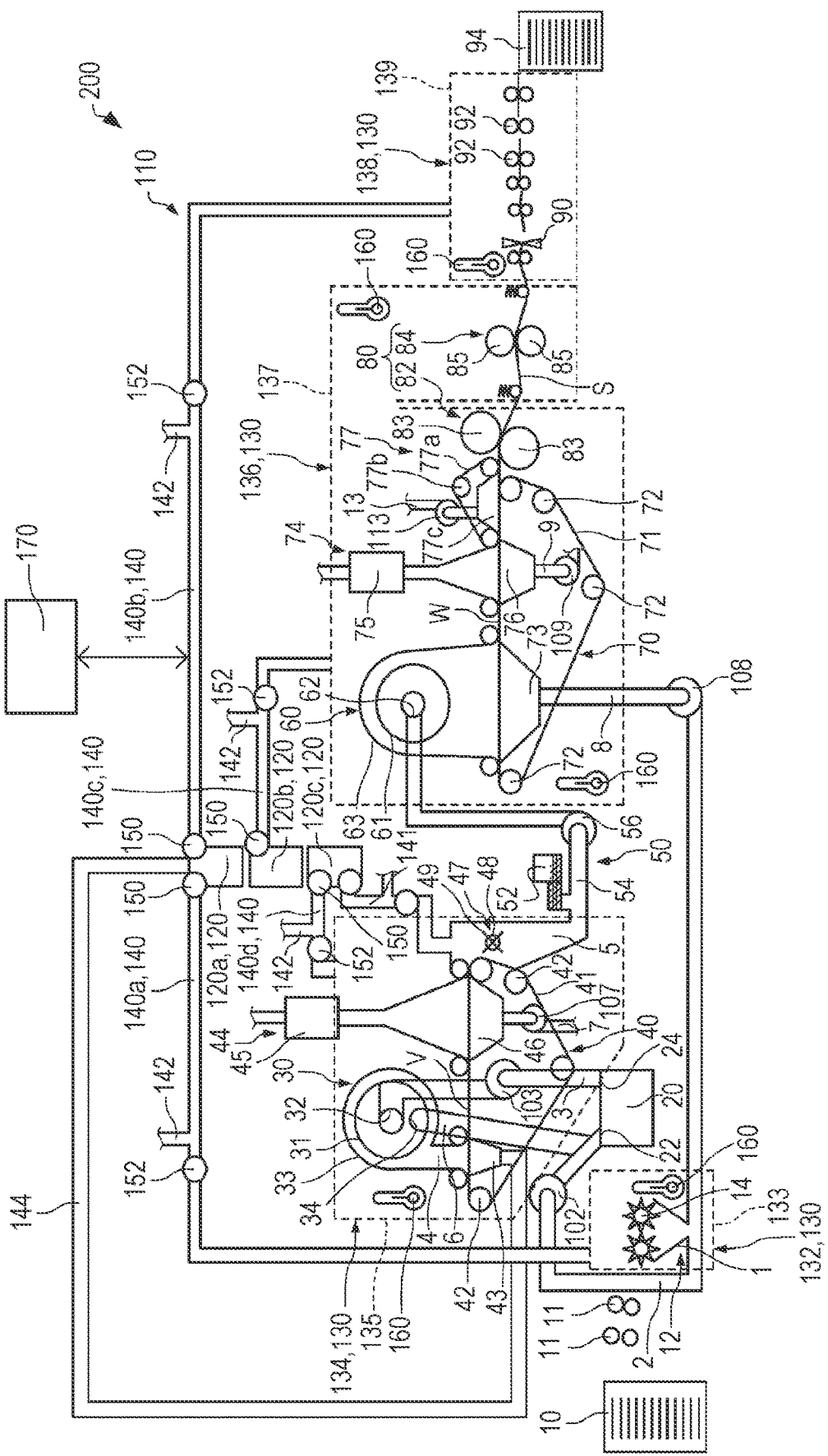
FIG. 4 is a diagram schematically illustrating a sheet manufacturing apparatus according to a second embodiment.

Next, a sheet manufacturing apparatus according to a second embodiment will be described with reference to the drawings. FIG. 4 is a diagram schematically illustrating a sheet manufacturing apparatus 200 according to the second embodiment.

The structural members of the sheet manufacturing apparatus 200 according to the second embodiment that have the same functions as the structural members of the sheet manufacturing apparatus 100 according to the first embodiment are denoted by the same reference numerals and the detailed descriptions thereof are omitted.

The sheet manufacturing apparatus 200 is different from the sheet manufacturing apparatus 100 in that the manufacturing section 110 includes a second connection pipe 144 as illustrated in FIG. 4.

The second connection pipe 144 couples the suction mechanism 43 and the humidifier 120a to each other. The suction mechanism 43 is a suction section that sucks the heat generated in the defibering section 20. The defibering section 20 generates heat when defibering the raw material. The defibering section 20 is, for example, the hottest portion in the sheet manufacturing apparatus 100.

2.2 Control Method for Sheet Manufacturing Apparatus

Figure 5:
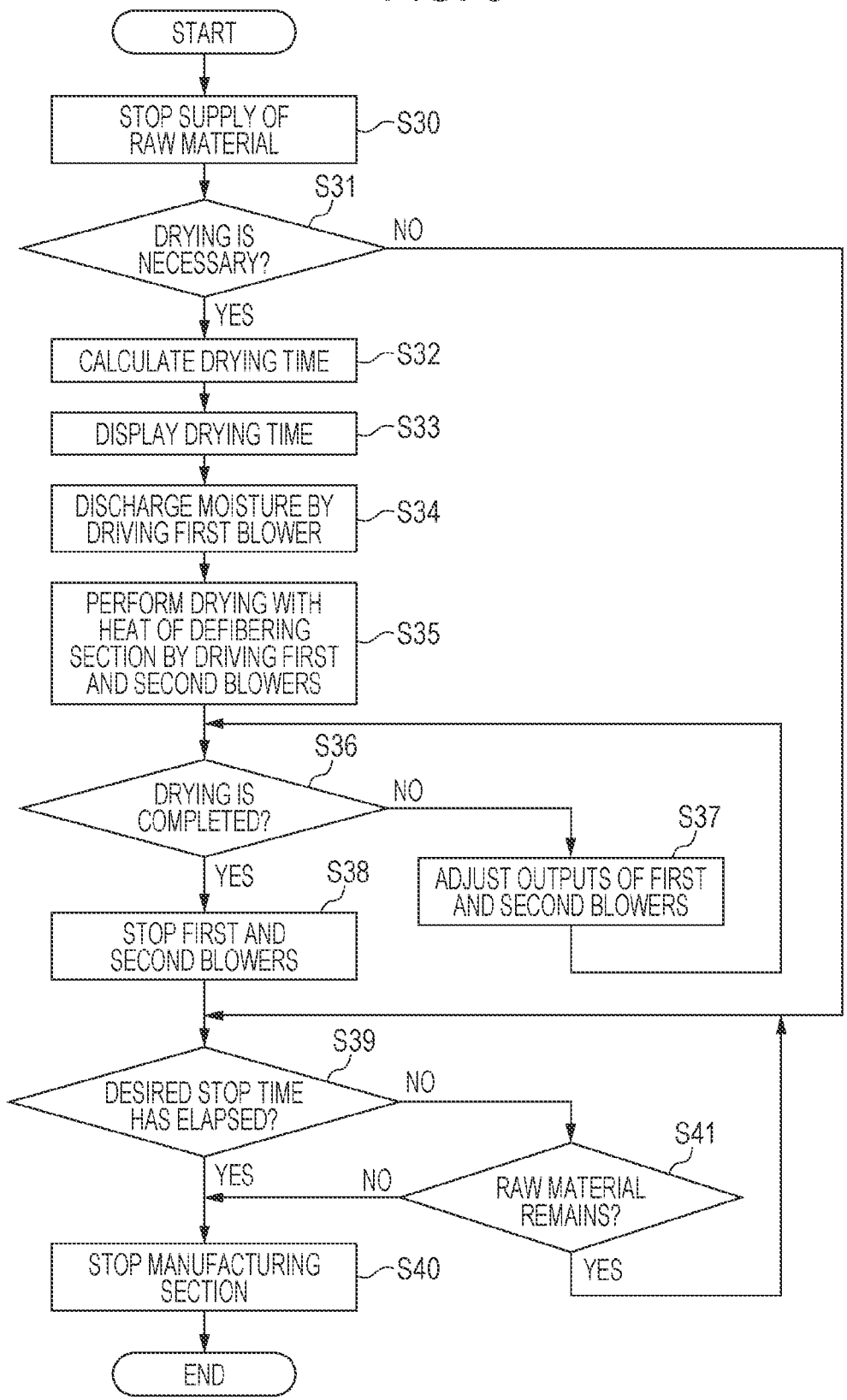
FIG. 5 is a flowchart for describing a control method for the sheet manufacturing apparatus according to the second embodiment.

Next, a control method for the sheet manufacturing apparatus 200 according to the second embodiment will be described with reference to the drawings. FIG. 5 is a flowchart for describing the control method for the sheet manufacturing apparatus 200 according to the second embodiment.

The differences between the control method for the sheet manufacturing apparatus 200 according to the second embodiment and the control method for the sheet manufacturing apparatus 100 according to the first embodiment will be described below and the similarities therebetween will be briefly described or not described.

The processing for stopping the supply of the raw material in step S30, the processing for determining whether the predetermined areas 130 need to be dried in step S31, the processing for calculating the drying time in step S32, and the processing for displaying the drying time in step S33, which are illustrated in FIG. 5, are basically the same as steps S10 to S13 described above.

Figure 6:
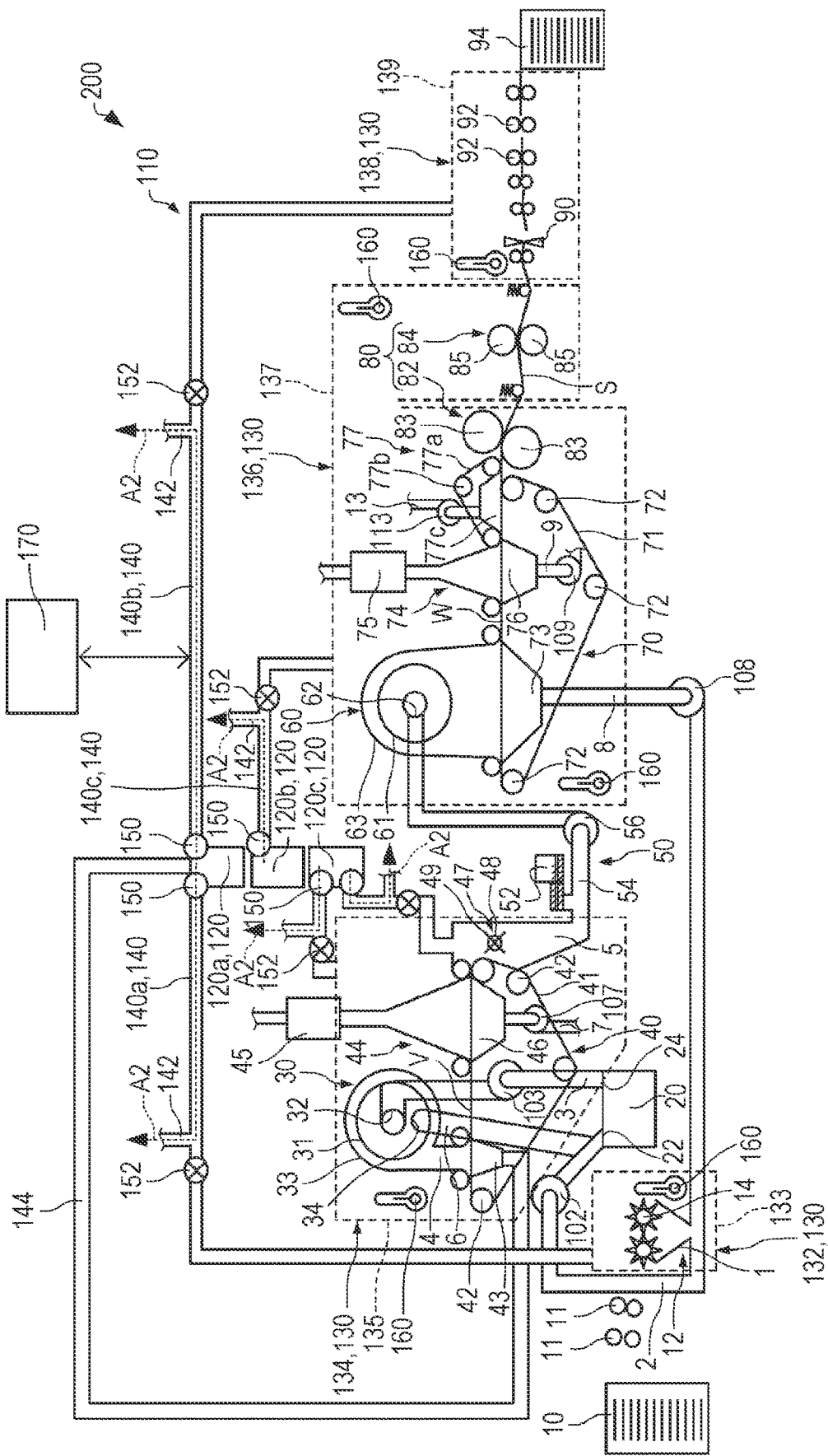
FIG. 6 is a diagram schematically illustrating the sheet manufacturing apparatus according to the second embodiment.

Next, in step S34, the control section 170 discharges the moisture in the humidifier 120 through the branch pipe 142 by driving the first blowers 150 with the driving of the second blowers 152 stopped as illustrated in FIG. 6. Before performing step S34, the first blower 150 and the second blowers 152 may or may not be driven. The heat of the defibering section 20 sucked by the suction mechanism 43 in step S34 is transmitted to the humidifier 120a. For example, the humidifier 120b communicates with the humidifier 120a, and the humidifier 120c communicates with the humidifier 120b. Accordingly, the heat of the defibering section 20 sucked by the suction mechanism 43 can be transmitted to the humidifiers 120a, 120b, and 120c.

It should be noted that FIG. 6 is a sectional view schematically illustrating the sheet manufacturing apparatus 200 and describing the control method for the sheet manufacturing apparatus 200. In FIG. 6, the flows of moisture in the humidifiers 120 is indicated by arrows A2. In addition, in FIG. 6, the second blowers 152 that are not driven are illustrated by circles with crosses.

Next, in step S35, the control section 170 dries the predetermined area 130 by controlling the first blowers 150 and the second blowers 152.

Figure 7:
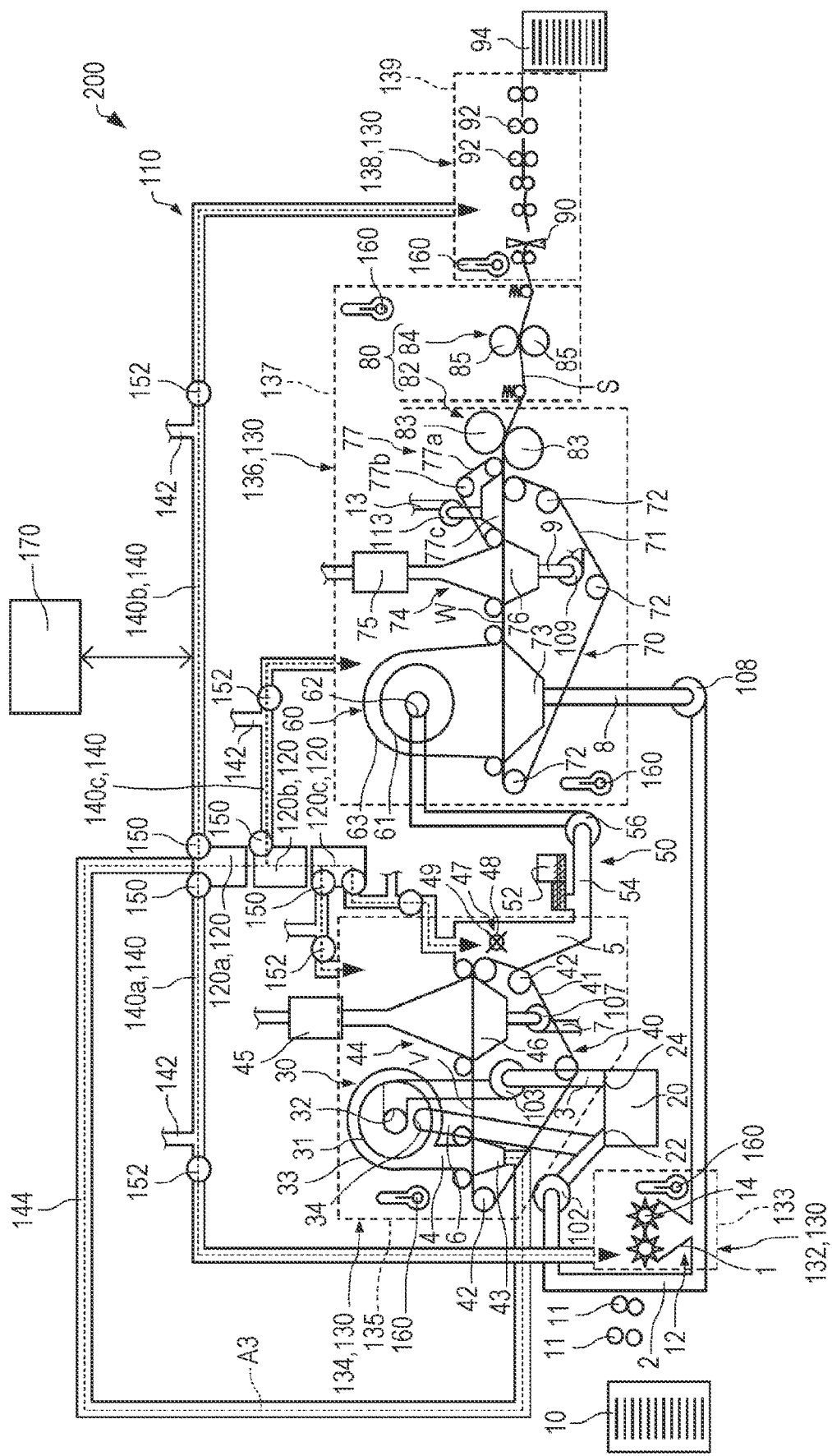
FIG. 7 is a diagram schematically illustrating the sheet manufacturing apparatus according to the second embodiment.

Specifically, as illustrated in FIG. 7, the control section 170 transmits the heat of the defibering section 20 sucked by the suction mechanism 43 to the predetermined area 130 by driving the first blowers 150 and the second blowers 152. The predetermined area 130 is dried with this heat.

It should be noted that FIG. 7 is a diagram schematically illustrating the sheet manufacturing apparatus 200 and describing the control method for the sheet manufacturing apparatus 200. In FIG. 7, the heat of the defibering section 20 sucked by the suction mechanism 43 is indicated by arrow A3.

Next, in step S36, the control section 170 determines whether the drying of the predetermined area 130 is completed. Step S36 is basically the same as step S15 described above.

In step S37, when determining that the drying of the predetermined area 130 is not completed, that is, the result in step S36 is NO, the control section 170 acquires the detection values of the humidity sensors 160 and adjusts the outputs of the first blowers 150 and the second blowers 152 in accordance with the acquired detection values of the humidity sensor 160. The control section 170 repeats steps S36 and S37 until it is determined in step S36 that the drying of the predetermined area 130 is completed.

In step S38, when determining that the drying of the predetermined area 130 is completed, that is, the result in step S36 is YES, the control section 170, the control section 170 stops the driving of the first blower 150 and the second blowers 152.

The processing for determining whether the desired stop time has been elapsed in step S39, the processing for stopping the operation of the manufacturing section 110 in step S40, and the processing for determining whether the raw material of the sheet S remains in the manufacturing section 110 in step S41 that follow are basically the same as steps S18 to S20 described above.

2.3 Operation and Effect

In the control method for the sheet manufacturing apparatus 200, the sheet manufacturing apparatus 200 includes the defibering section 20 that defibers the raw material, the suction mechanism 43 that sucks the heat generated in the defibering section 20, and the second connection pipe 144 that couples the suction mechanism 43 and the humidifiers 120 to each other, and the humidifiers 120 are evaporative humidifiers that cause moisture vaporization. Accordingly, in the control method for the sheet manufacturing apparatus 200, the heat generated in the defibering section 20 can be transmitted to the humidifiers 120. This can compensate for the heat taken away by vaporizing moisture in the humidifiers 120.

The control method for the sheet manufacturing apparatus 200 includes a step of discharging the moisture in the humidifiers 120 through the branch pipes 142 by driving the first blowers 150 with the driving of the second blowers 152 stopped before the drying step and, in the drying step, the heat sucked by the suction mechanism 43 is transmitted to the predetermined area 130 by the first blowers 150 and the second blowers 152 being driven. Accordingly, in the control method for the sheet manufacturing apparatus 200, the predetermined areas 130 can be dried with the heat generated in the defibering section 20.

3. Third Embodiment 3.1 Sheet Manufacturing Apparatus

Figure 8:
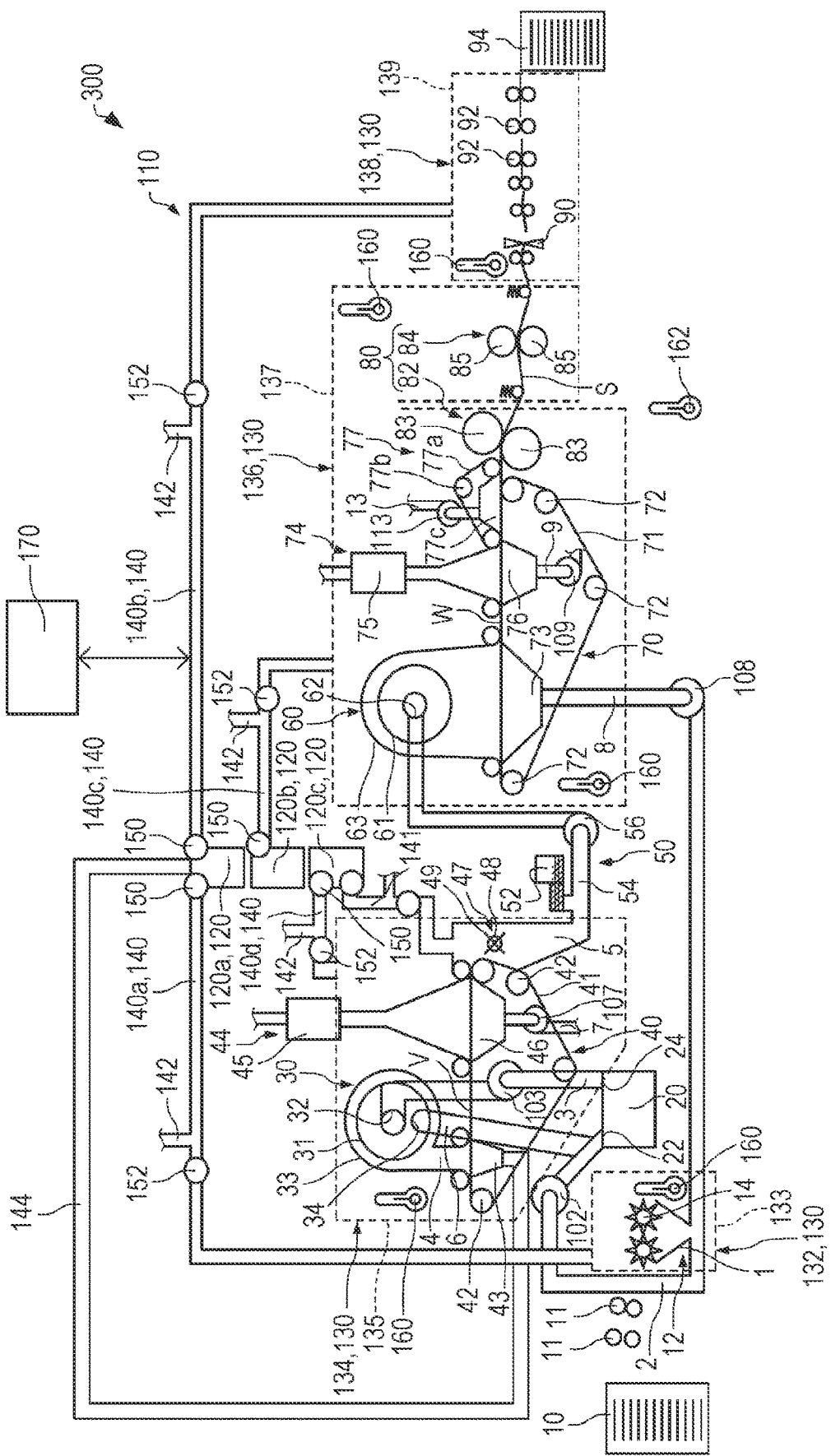
FIG. 8 is a diagram schematically illustrating a sheet manufacturing apparatus according to a third embodiment.

Next, a sheet manufacturing apparatus according to a third embodiment will be described with reference to the drawings. FIG. 8 is a diagram schematically illustrating a sheet manufacturing apparatus 300 according to the third embodiment.

The structural members of the sheet manufacturing apparatus 300 according to the third embodiment that have the same functions as the structural members of the sheet manufacturing apparatus 100 according to the first embodiment and the sheet manufacturing apparatus 200 according to the second embodiment are denoted by the same reference numerals and the detailed descriptions thereof are omitted.

The sheet manufacturing apparatus 300 is different from the sheet manufacturing apparatus 200 in that the manufacturing section 110 includes an environmental humidity sensor 162 as illustrated in FIG. 8.

The environmental humidity sensor 162 is provided outside the predetermined area 130. The environmental humidity sensor 162 detects the environmental humidity outside the predetermined areas 130. The environmental humidity sensor 162 may also be able to detect the environmental temperature.

3.2 Control Method for the Sheet Manufacturing Apparatus

Figure 9:
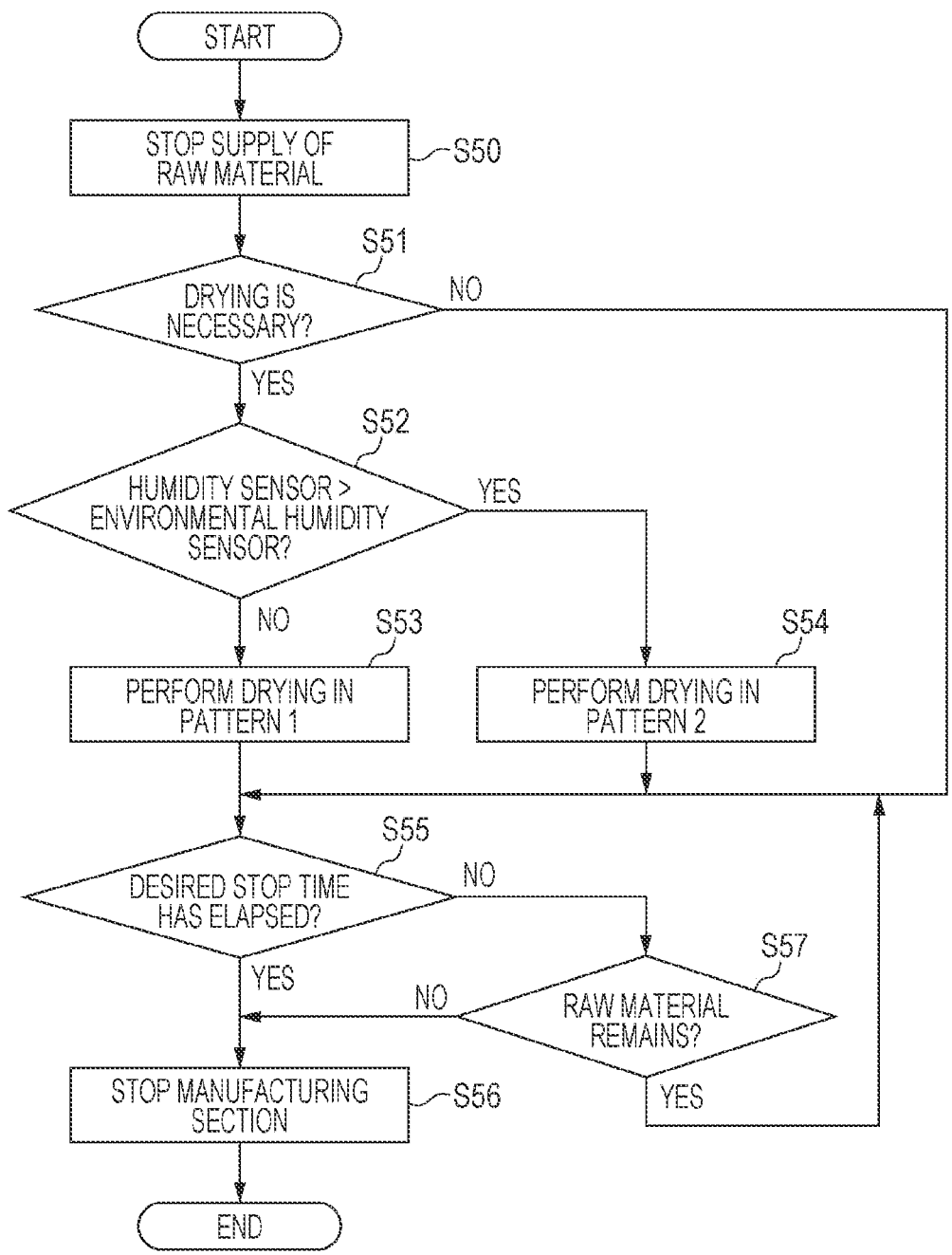
FIG. 9 is a flowchart for describing a control method for the sheet manufacturing apparatus according to the third embodiment.

Next, the sheet manufacturing apparatus 300 according to the third embodiment will be described with reference to the drawings. FIG. 9 is a flowchart for describing the control method for the sheet manufacturing apparatus 300 according to the third embodiment.

The differences between the control method for the sheet manufacturing apparatus 300 according to the third embodiment and the control method for the sheet manufacturing apparatus 100 according to the first embodiment and the differences between the control method for the sheet manufacturing apparatus 300 according to the third embodiment and the control method for the sheet manufacturing apparatus 200 according to the second embodiment will be described below and the similarities thereof are briefly described or are not described.

The processing for stopping the supply of the raw material in step S50 and the processing for determining whether the predetermined areas 130 need to be dried in step S51, which are illustrated in FIG. 9, are basically the same as steps S10 and S11 described above.

Next, in step S55, the control section 170 determines whether the detection value of the humidity sensor 160 provided in the sorting area 134 is larger than the detection value of the environmental humidity sensor 162, which detects the environmental humidity, as illustrated in FIG. 9.

Specifically, the control section 170 acquires the detection value of the humidity sensor 160 provided in the sorting area 134 and the detection value of the environmental humidity sensor 162 and determines whether the acquired detection value of the humidity sensor 160 is larger than the acquired detection value of the environmental humidity sensor 162.

In step S53, when determining that the detection value of the humidity sensor 160 is larger than the detection value of the environmental humidity sensor 162, that is, the result in step S52 is YES, the control section 170 performs drying in pattern 1. Specifically, the control section 170 performs the processing of steps S12 to S17 illustrated in FIG. 2. Accordingly, the predetermined area 130 can be dried with the outside air.

In step S53, when determining that the detection value of the humidity sensor 160 is not larger than the detection value of the environmental humidity sensor 162, that is, the result in step S52 is NO, the control section 170 performs drying in pattern 2. Specifically, the control section 170 performs the processing of steps S32 to S38 illustrated in FIG. 5. This can dry the predetermined area 130 with the heat generated in the defibering section 20.

The processing for determining whether the desired stop time has been elapsed in step S55, the processing for stopping the operation of the manufacturing section 110 in step S56, and the processing for determining whether the raw material of the sheet S remains in the manufacturing section 110 in step S57 that follow are basically the same as steps S18 to S20 described above.

3.3 Operation and Effect

The control method for the sheet manufacturing apparatus 300 includes the humidity determination step of determining whether the detection value of the humidity sensor 160 is larger than the detection value of the environmental humidity sensor 162, which detects the environmental humidity, after the determination step and before the drying step. When it is determined that the detection value of the humidity sensor 160 is larger than the detection value of the environmental humidity sensor 162 in the humidity determination step, the predetermined area 130 is dried with the outside air in the drying step. When it is determined that the detection value of the humidity sensor 160 is not larger than the detection value of the environmental humidity sensor 162 in the humidity determination step, the predetermined area 130 is dried with the heat generated in the defibering section 20 in the drying step. Accordingly, the control step for the sheet manufacturing apparatus 300 can efficiently dry the predetermined area.

4. Fourth Embodiment 4.1 Sheet Manufacturing Apparatus

Figure 10:
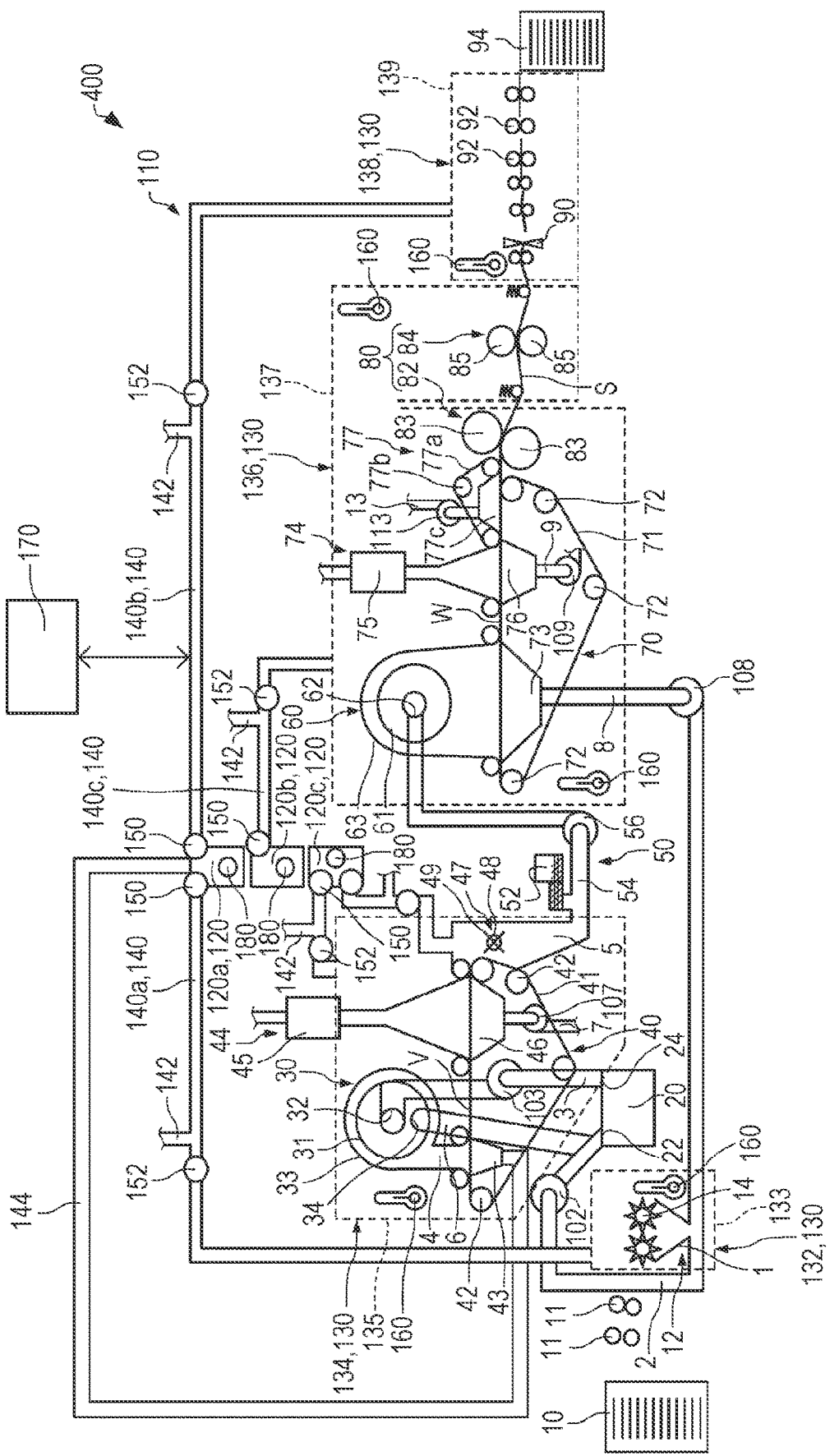
FIG. 10 is a diagram schematically illustrating a sheet manufacturing apparatus according to a fourth embodiment.

Next, a sheet manufacturing apparatus 300 according to a fourth embodiment will be described with reference to the drawings. FIG. 10 is a diagram schematically illustrating a sheet manufacturing apparatus 400 according to the fourth embodiment.

The structural members of the sheet manufacturing apparatus 400 according to the fourth embodiment that have the same functions as the structural members of the sheet manufacturing apparatus 100 according to the first embodiment and the sheet manufacturing apparatus 200 according to the second embodiment are denoted by the same reference numerals and the detailed descriptions thereof are omitted.

The sheet manufacturing apparatus 400 is different from the sheet manufacturing apparatus 200 in that the manufacturing section 110 has heaters 180 as illustrated in FIG. 10.

As illustrated in FIG. 10, the heaters 180 are provided in the humidifiers 120. The heater 180 may be provided between a suction section and a filter, which are not illustrated, of the humidifier 120. The heater 180 is not particularly limited, but may be, for example, a ceramic heater, a carbon heater, a halogen heater, a sheathed heater, or the like.

4.2 Control Method for Sheet Manufacturing Apparatus

Next, the control method for the sheet manufacturing apparatus 400 according to the fourth embodiment will be described. The control method for the sheet manufacturing apparatus 400 according to the fourth embodiment is basically the same as the control method for the sheet manufacturing apparatus 200 according to the second embodiment illustrated in FIG. 5 except that the heaters 180 are driven at the same time with the driving of the first blowers 150 in step S34 and the driving of the heaters 180 is stopped at the same time with the stopping of the first blowers 150 and the second blowers 152 in step S38 in the control method for the sheet manufacturing apparatus 200. Accordingly, the detailed description thereof are omitted.

4.3 Effect and Operation

In the sheet manufacturing apparatus 400, the manufacturing section 110 includes the humidifiers 120 that humidify the predetermined areas 130 and the heaters 180 provided in the humidifiers 120. Accordingly, the sheet manufacturing apparatus 400 can efficiently dry a wet portion in the humidifier 120 by the heat of the heater 180 when moisture in the humidifier 120 is discharged through the branch pipe 142. Furthermore, by transmitting the heat of the heater 180 to the predetermined area 130 when the heat generated in the defibering section 20 is transmitted to the predetermined area 130, even when condensation occurs in the predetermined area 130, the portion wet by the condensation can be efficiently dried.

The embodiments and modifications described above are only examples, and the present disclosure is not limited thereto. For example, the embodiments and the modifications can be combined with each other as appropriate.

The present disclosure includes a structure substantially the same as the structures described in the embodiments. That is, the present disclosure includes, for example, a structure having the same function, method, and result or a structure having the same object and effect. In addition, the present disclosure also includes a structure in which non-essential parts of the structures described in the embodiments have been replaced. In addition, the present disclosure includes a structure having the same operation and effect as the structures described in the embodiments or a structure capable of achieving the same object. In addition, the present disclosure includes a structure obtained by adding a known technique to the structures described in the embodiments.

What is derived from the embodiments and modifications described above will be described below.

The control method for a sheet manufacturing apparatus according to an aspect of the present disclosure includes: the stop signal input step of inputting, to the sheet manufacturing apparatus manufacturing the sheet, the stop signal stopping manufacturing of the sheet; and the drying step of drying the predetermined area of the sheet manufacturing apparatus by controlling the blower of the sheet manufacturing apparatus after the stop signal input step.

This control method for the sheet manufacturing apparatus can reduce the possibility that rust forms or biological contaminants proliferate due to moisture after the manufacturing of the sheet is stopped.

The control method for a sheet manufacturing apparatus according to an aspect may further include the determination step of determining whether the predetermined area needs to be dried in accordance with the detection value of the humidity sensor provided in the predetermined area, in which the drying step may be performed when it is determined in the determination step that the predetermined area needs to be dried.

According to this control method for the sheet manufacturing apparatus, since the drying step is performed only when the predetermined area needs to be dried, power can be saved compared with the case in which the drying step is always performed without the determination step.

The control method for a sheet manufacturing apparatus according to an aspect may further include calculating a time required for the drying step in accordance with the detection value of the humidity sensor.

According to this control method for the sheet manufacturing apparatus, it is possible to inform the user of the time required for the drying step.

In the control method for a sheet manufacturing apparatus, the sheet manufacturing apparatus may include the humidifier humidifying the predetermined area, the first connection pipe coupling the humidifier and the predetermined area to each other, the first blower as the blower, the first blower being provided in the first connection pipe, the second blower as the blower, the second blower being provided in the first connection pipe, the second blower being located closer to the predetermined area than the first blower in the path of the first connection pipe, and the branch pipe branched from the first connection pipe between the first blower and the second blower.

According to this control method for the sheet manufacturing apparatus, the predetermined area can be humidified with the humidifier.

In the control method for a sheet manufacturing apparatus according to an aspect, in the drying step, outside air supplied through the branch pipe may be blown to the predetermined area by the second blower being driven with the driving of the first blower stopped.

This control method for the sheet manufacturing apparatus can dry the predetermined area with the outside air.

In the control method for a sheet manufacturing apparatus according to an aspect, the sheet manufacturing apparatus may include the defibering section defibering the raw material, the suction section sucking heat generated in the defibering section, the second connection pipe coupling the suction section and the humidifier to each other, in which the humidifier may be the evaporative humidifier that causes moisture vaporization.

According to this control method for the sheet manufacturing apparatus, the heat taken by vaporizing moisture in the humidifier can be compensated for.

The control method for a sheet manufacturing apparatus according to an aspect may further include discharging moisture in the humidifier through the branch pipe by driving the first blower with driving of the second blower stopped before the drying step, in which the drying step may transmit the heat sucked by the suction section to the predetermined area by driving the first blower and the second blower.

According to this control method for the sheet manufacturing apparatus, the predetermined area can be dried with the heat generated in the defibering section.

The control method for a sheet manufacturing apparatus according to an aspect may further include the humidity determination step of determining whether the detection value of the humidity sensor is larger than the detection value of the environmental humidity sensor detecting environmental humidity after the determination step and before the drying step, in which the predetermined area may be dried with outside air when it is determined in the humidity determination step that the detection value of the humidity sensor is larger than the detection value of the environmental humidity sensor, and the predetermined area may be dried with the heat in the drying step when it is determined in the humidity determination step that the detection value of the humidity sensor is not larger than the detection value of the environmental humidity sensor.

According to this control method for the sheet manufacturing apparatus, the predetermined area can be efficiently dried.

In the control method for a sheet manufacturing apparatus according to an aspect, the predetermined area may be the coarse crushing area in which the raw material is coarsely crushed, the sorting area in which the defibered substance coarsely crushed and defibered is sorted, the sheet forming area in which the sheet is formed by accumulating the sorted defibered substance, or the cutting area in which the sheet is cut.

According to this control method for the sheet manufacturing apparatus, at least one of the coarse crushing area, the sorting area, the sheet forming area, and the cutting area can be dried.

The sheet manufacturing apparatus according to an aspect includes: the manufacturing section manufacturing the sheet; and the control section controlling the manufacturing section, in which the control section dries the predetermined area of the manufacturing section by controlling the blower of the manufacturing section when receiving the stop signal stopping operation of the manufacturing section.

According to this control method for the sheet manufacturing apparatus, it is possible to reduce the possibility that rust forms or biological contaminants proliferate due to moisture after the manufacturing of sheets is stopped.

In the sheet manufacturing apparatus according to an aspect, the manufacturing section may include the humidifier humidifying the predetermined area and the heater provided in the humidifier.

According to this control method for the sheet manufacturing apparatus, the wet portion in the humidifier can be efficiently dried by the heat of the heater.

What is claimed is:

1. A control method for a sheet manufacturing apparatus, the method comprising:
    a stop signal input step of inputting, to the sheet manufacturing apparatus manufacturing a sheet, a stop signal stopping manufacturing of the sheet;
    a drying step of drying a predetermined area of the sheet manufacturing apparatus by controlling a blower of the sheet manufacturing apparatus after the stop signal input step; and
    a determination step of determining whether the predetermined area needs to be dried in accordance with a detection value of a humidity sensor provided in the predetermined area, wherein
    the drying step is performed when it is determined in the determination step that the predetermined area needs to be dried.

2. The control method for a sheet manufacturing apparatus according to claim 1, further comprising:
    calculating a time required for the drying step in accordance with the detection value of the humidity sensor.

3. The control method for a sheet manufacturing apparatus according to claim 1, wherein
    the sheet manufacturing apparatus includes
    a humidifier humidifying the predetermined area,
    a first connection pipe coupling the humidifier and the predetermined area to each other,
    a first blower as the blower, the first blower being provided in the first connection pipe,
    a second blower as the blower, the second blower being provided in the first connection pipe, the second blower being located closer to the predetermined area than the first blower in a path of the first connection pipe, and a branch pipe branched from the first connection pipe between the first blower and the second blower.

4. The control method for a sheet manufacturing apparatus according to claim 3, wherein in the drying step, outside air supplied through the branch pipe is blown to the predetermined area by the second blower being driven with the driving of the first blower stopped.

5. The control method for a sheet manufacturing apparatus according to claim 3, wherein the sheet manufacturing apparatus includes a defibering section for defibering a raw material, a suction section for sucking heat generated in a defibering section, and a second connection pipe coupling the suction section and the humidifier to each other, wherein the humidifier is an evaporative humidifier that causes moisture vaporization.

6. The control method for a sheet manufacturing apparatus according to claim 5, further comprising:

discharging moisture in the humidifier through the branch pipe by driving the first blower with driving of the second blower stopped before the drying step, wherein in the drying step, the heat sucked by the suction section is transmitted to the predetermined area by the first blower and the second blower being driven.

7. The control method for a sheet manufacturing apparatus according to claim 5, further comprising:

a humidity determination step of determining whether the detection value of the humidity sensor is larger than a detection value of an environmental humidity sensor detecting environmental humidity after the determination step and before the drying step, wherein the predetermined area is dried with outside air when it is determined in the humidity determination step that the detection value of the humidity sensor is larger than the detection value of the environmental humidity sensor, and the predetermined area is dried with the heat in the drying step when it is determined in the humidity determination step that the detection value of the humidity sensor is not larger than the detection value of the environmental humidity sensor.

8. The control method for a sheet manufacturing apparatus according to claim 1, wherein the predetermined area is a coarse crushing area in which a raw material is coarsely crushed, a sorting area in which a defibered substance coarsely crushed and defibered is sorted, a sheet forming area in which the sheet is formed by accumulating the sorted defibered substance, or a cutting area in which the sheet is cut.

* * * * *